United States Patent
Uesugi

(10) Patent No.: US 6,510,133 B1
(45) Date of Patent: Jan. 21, 2003

(54) MULTI-CARRIER TRANSMISSION METHOD AND DATA TRANSMITTER

(75) Inventor: Mitsuru Uesugi, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/147,566

(22) PCT Filed: May 28, 1998

(86) PCT No.: PCT/JP98/02341

§ 371 (c)(1),
(2), (4) Date: Jan. 21, 1999

(87) PCT Pub. No.: WO98/54860

PCT Pub. Date: Mar. 12, 1998

(30) Foreign Application Priority Data

May 30, 1997 (JP) .............................. 9-158123

(51) Int. Cl.⁷ .............................. H04J 11/00; H04J 1/04
(52) U.S. Cl. ........................ 370/208; 370/477; 370/482
(58) Field of Search ................................. 370/208, 419, 370/206, 464, 468, 477, 480, 481, 482, 310, 328, 330, 343, 344; 375/222

(56) References Cited

U.S. PATENT DOCUMENTS

| | | | | |
|---|---|---|---|---|
| 4,841,521 A | * | 6/1989 | Amada et al. ............... | 370/296 |
| 5,327,580 A | * | 7/1994 | Vignali et al. .............. | 455/35.1 |
| 5,371,548 A | * | 12/1994 | Williams ..................... | 348/478 |
| 5,559,788 A | * | 9/1996 | Zscheile, Jr. et al. ....... | 370/206 |
| 5,602,835 A | * | 2/1997 | Seki et al. ................... | 370/206 |
| 5,654,955 A | * | 8/1997 | Natali ......................... | 370/320 |
| 5,751,716 A | * | 5/1998 | Tzannes et al. ............. | 370/468 |
| 5,862,189 A | * | 1/1999 | Huisken et al. ............. | 375/341 |
| 5,953,311 A | * | 9/1999 | Davies et al. ............... | 370/210 |
| 6,005,894 A | * | 12/1999 | Kumar ........................ | 375/170 |
| 6,061,392 A | * | 5/2000 | Bremer et al. .............. | 375/222 |
| 6,064,662 A | * | 5/2000 | Gitlin et al. ................ | 370/330 |
| 6,128,111 A | * | 10/2000 | Roberts ....................... | 359/110 |
| 6,175,550 B1 | * | 1/2001 | Van Nee .................... | 370/206 |

FOREIGN PATENT DOCUMENTS

| | | |
|---|---|---|
| EP | 0673131 | 9/1995 |
| JP | 4501348 | 3/1992 |
| JP | 7283806 | 10/1995 |
| JP | 8-88617 | 4/1996 |
| JP | 8316932 | 11/1996 |
| WO | 9004893 | 5/1990 |
| WO | 96/34480 | 10/1996 |

OTHER PUBLICATIONS

English Language Abstract of JP–7–283806.
English Language Abstract of JP–8–316932.
English Language Abstract of JP–4–501348.
English Language Translation of the technical terms employed in Fig. 6.

* cited by examiner

*Primary Examiner*—Hassan Kizou
*Assistant Examiner*—Saba Tsegaye
(74) *Attorney, Agent, or Firm*—Greenblum & Bernstein, P.L.C.

(57) ABSTRACT

Equipped with a plurality of mapping blocks 102 and 103 that carry out mappings of different rates, signals subjected to low-speed mapping are placed in the periphery of a band to which a plurality of sub-carriers are assigned at an interval corresponding to the symbol rate. The signal placed on the frequency axis in this way is converted to a time waveform through inverse Fourier transformation block 105, converted to a symbol time series through parallel/serial conversion block 106, then quadrature-modulated and transmitted.

10 Claims, 14 Drawing Sheets

MULTI-CARRIER TRANSMISSION METHOD AND DATA TRANSMITTER

TECHNICAL FIELD

The present invention relates to a multi-carrier transmission method, data transmission apparatus using this method, and mobile station and base station apparatuses incorporating this data transmission apparatus.

BACKGROUND ART

In mobile communications, there is a strong demand for multi-path fading countermeasures and improvement of the transmission quality. Multi-path fading can be overcome by reducing the symbol rate. On the other hand, implementing high-speed data transmission requires multi-carrier transmission. The best way to narrow sub-carrier intervals in multi-carrier transmission is the OFDM system. Conventional data transmission apparatuses using the OFDM system prevent leakage of unnecessary signals to outside a band by inserting null symbols at both ends of the band or placing restrictions on the band.

FIG. 1 is a block diagram showing the configuration of a data transmission apparatus using the OFDM system. In the data transmission apparatus shown in said figure, transmission data 1 is mapped by mapping block 2. For example, in the case of QPSK, mapping is carried out on 4 types of phase, 2 bits at a time, and in the case of ASK, mapping is carried out on 2 types of amplitude, one amplitude bit at a time. The mapped signal is serial/parallel-converted in serial/parallel conversion block 4 and then subjected to inverse Fourier transformation (IFFT) together with null symbol 3 in inverse Fourier conversion block 5. Through this processing, the signal placed on the frequency axis is converted to a time waveform.

FIG. 2 is a drawing showing the spectrum of a single sub-carrier centered on frequency f0. FIG. 3 shows these spectra lined up on the frequency axis. In this example, signals are carried on five sub-carriers and no signal is transmitted on 4 bands on each of the right and left sides. This band area where no signal is transmitted is called "guard frequency band," which is implemented by means of null symbol 3.

The inverse-Fourier-transformed signal by inverse Fourier transformation block 5 is modulated through parallel/serial conversion in parallel/serial conversion block 6 to a time-series signal and further quadrature-modulated in quadrature modulation block 7 to a radio frequency signal and transmitted from transmission antenna 8. Thus, providing the guard frequency band where no signal is transmitted by means of null symbol 3 prevents leakage of unnecessary signal components to outside the band.

However, the data transmission apparatus above requires a lot of null symbols, which results in inconvenience such that the frequency utilization efficiency is reduced when carrying out frequency division especially on the uplink and that it is more vulnerable to distortion by multi-paths, etc.

FIG. 4 is a block diagram showing the configuration of a data transmission apparatus reinforced by guard intervals against distortion by multi-paths. In the data transmission apparatus shown in said figure, transmission data 1 is mapped by mapping block 2 and the mapped signal is serial/parallel-converted in serial/parallel conversion block 4, then subjected to inverse Fourier transformation together with null symbol 3 in inverse Fourier transformation block 5, and the signal placed on the frequency axis is transformed to a time waveform. The inverse-Fourier-transformed signal is converted to a time-series signal through parallel/serial conversion by parallel/serial conversion block 6. Then, guard intervals are inserted into this signal in guard interval insertion block 9.

As shown in FIG. 5, the guard interval is the last part of a valid symbol period added to the start of the symbol. This prevents distortion even if a delay wave lasting shorter than the guard interval may exist, making the signal resistant to multi-paths.

The signal with the guard interval inserted is quadrature-modulated in quadrature modulation block 7, converted to a radio frequency signal and transmitted from transmission antenna 8. Thus, inserting the guard interval makes the signal resistant to multi-paths.

However, the data transmission apparatus described above has a defect of its transmission efficiency being reduced due to the guard interval inserted to make the signal resistant to multi-paths, requiring a lot of null symbols. This results in a reduction of the frequency utilization efficiency especially when carrying out frequency division on the uplink.

FIG. 6 is a block diagram showing the configuration of a data transmission apparatus with the frequency utilization efficiency improved by narrowing the guard frequency through band restrictions. In the data transmission apparatus shown in said figure, transmission data 1 is mapped by mapping block 2 and the mapped signal is serial/parallel-converted in serial/parallel conversion block 4, then subjected to IFFT in inverse Fourier transformation block 5. The signal subjected to IFFT is parallel/serial-converted in parallel/serial conversion block 6 to a time-series signal and guard intervals are inserted into it in guard interval insertion block 9. The signal with the guard interval inserted is subjected to band restrictions in band restriction block 10 with the guard frequency band narrowed, then quadrature-modulated in quadrature modulation block 7 to a radio frequency signal and transmitted from transmission antenna 8.

In this case, in order to absorb distortion due to the band restrictions by band restriction block 10, providing guard intervals with a length corresponding to the impulse response length of a band restriction filter can remove distortion due to the band restrictions. Thus, band restrictions through band restriction block 10 can narrow the guard frequency part and improve the frequency utilization efficiency without null symbol insertion, etc.

However, the data transmission apparatus described above has a defect of its time efficiency being reduced because it requires extra guard intervals corresponding to the length of impulse response of the filter used for band restrictions.

FIG. 7 is a block diagram showing the configuration of a data transmission apparatus that disperses load between a guard frequency and guard interval. In the data transmission apparatus shown in said figure, transmission data 1 is mapped by mapping block 2 and the mapped signal is serial/parallel-converted in serial/parallel conversion block 4, then subjected to inverse Fourier transformation together with null symbol 3 in inverse Fourier transformation block 5. The signal subjected to IFFT in inverse Fourier transformation block 5 is parallel/serial-converted in parallel/serial conversion block 6 to a time-series signal and guard intervals are inserted into it in guard interval insertion block 9. This signal is subjected to band restrictions in band restriction block 10 with its guard frequency reduced, then quadrature-modulated in quadrature modulation block 7 to a radio frequency signal and transmitted from transmission antenna 8. Thus, carrying out both insertion of null symbol 3 and band restrictions makes it possible to reduce the number of null symbols compared to the case where only null symbol 303 is inserted and reduce the length of guard intervals to absorb distortion due to filtering compared to the case where only band restrictions are applied.

However, although this apparatus disperses load between the guard frequency and guard interval, it has the disadvantage of both the frequency utilization efficiency and time efficiency being reduced.

Thus, the conventional data transmission apparatus has problems that require solutions such as reducing the frequency utilization efficiency because it requires a lot of null symbols, being vulnerable to distortion by multi-paths because it has no guard interval, reducing the transmission efficiency due to the guard interval, reducing the time efficiency due to extra guard intervals, etc.

DISCLOSURE OF INVENTION

It is an objective of the present invention to provide a data transmission apparatus capable of improving the frequency utilization efficiency at both ends of a band, resistant to multi-paths because of its ability to introduce guard intervals, and capable of securing both the frequency utilization efficiency and time utilization efficiency by introducing band restrictions.

This objective is achieved by a multi-carrier transmission method that sets the distance between sub-carriers so that they may be orthogonal to one another, assigns a plurality of sub-carriers to a specific band and assigns low-speed variable signals to the guard frequency parts set at both ends of the specific band.

BEST MODE FOR CARRYING OUT THE INVENTION

Figure 1:
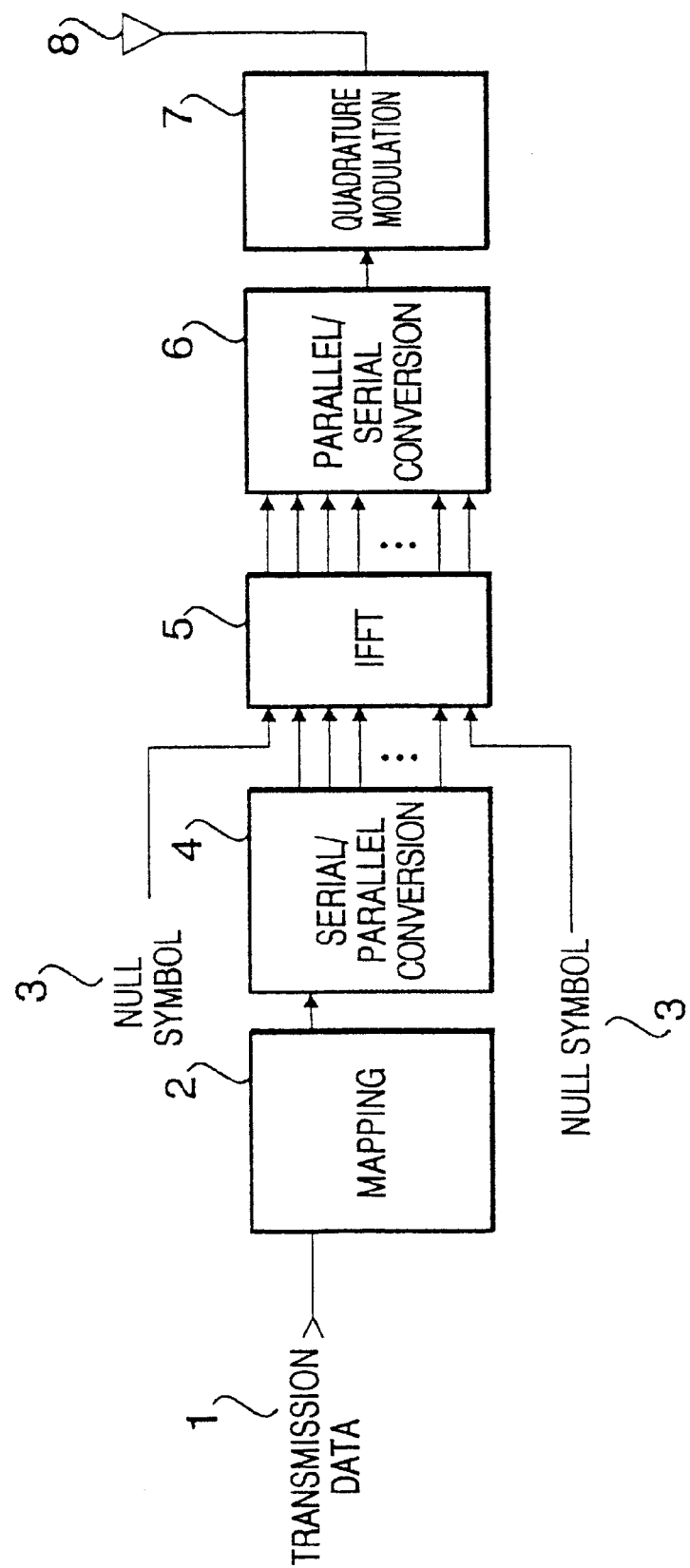
FIG. 1 is a functional block diagram of a conventional data transmission apparatus that inserts null symbols.
Figure 2:
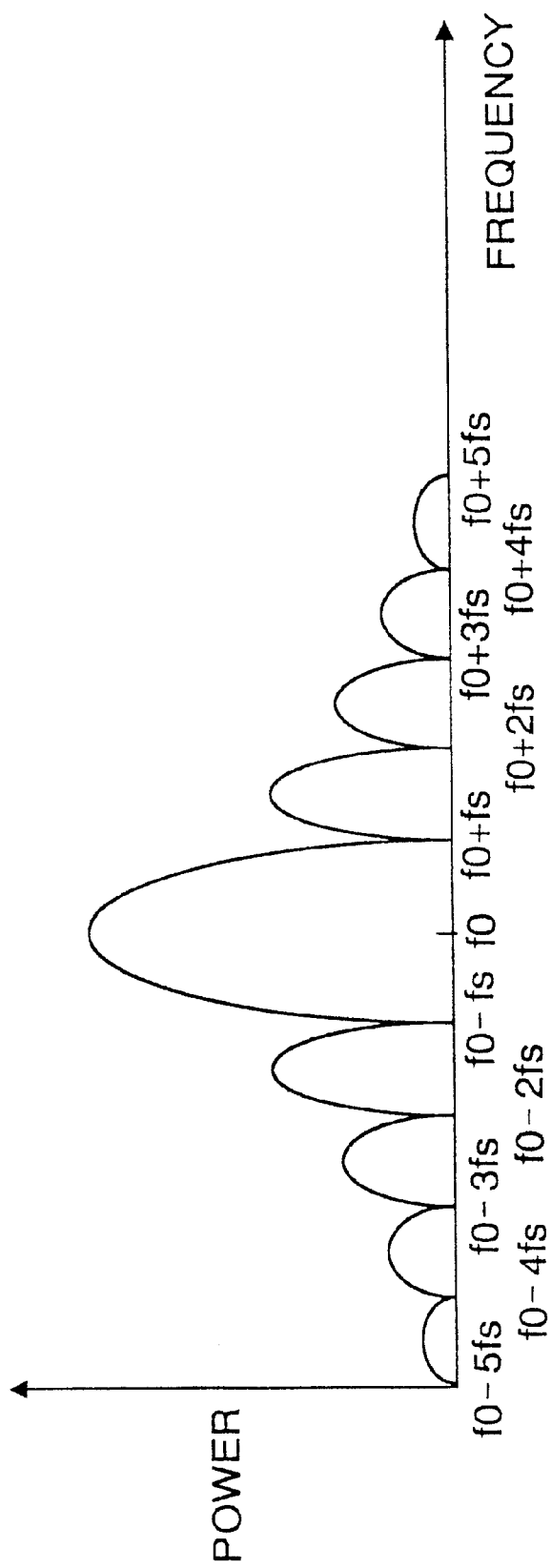
FIG. 2 is a spectral map of a single carrier.
Figure 3:
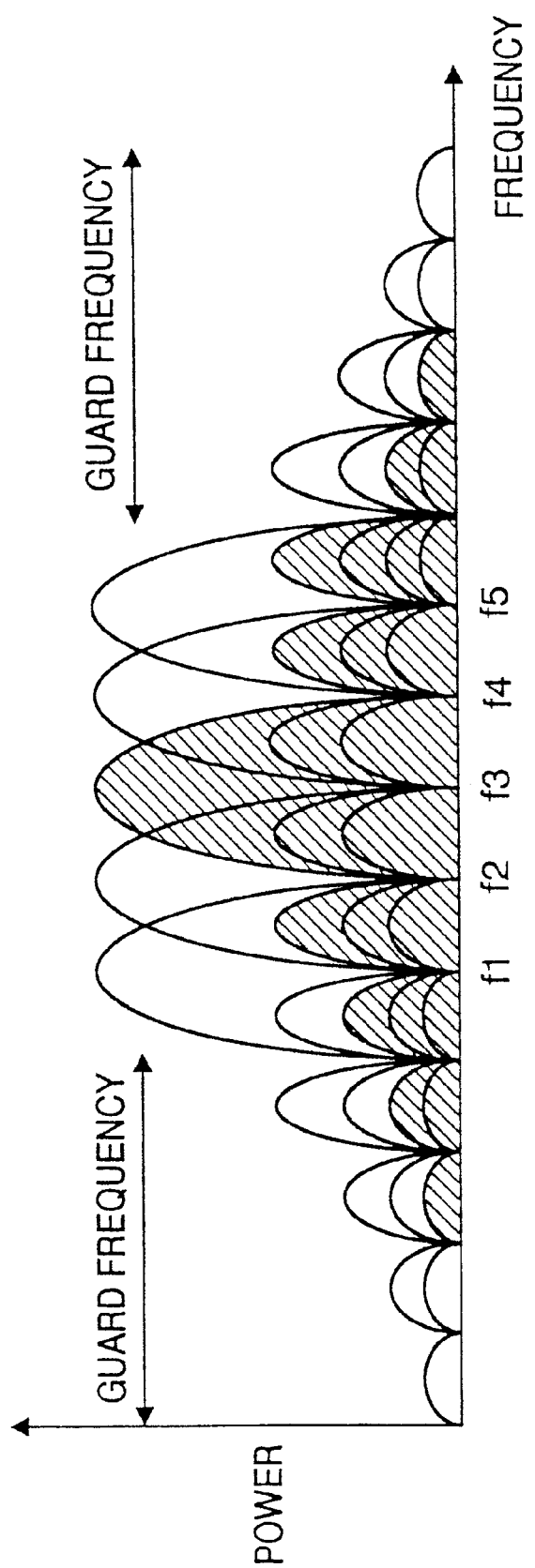
FIG. 3 is a spectral map of sub-carriers forming. multi-carriers.
Figure 4:
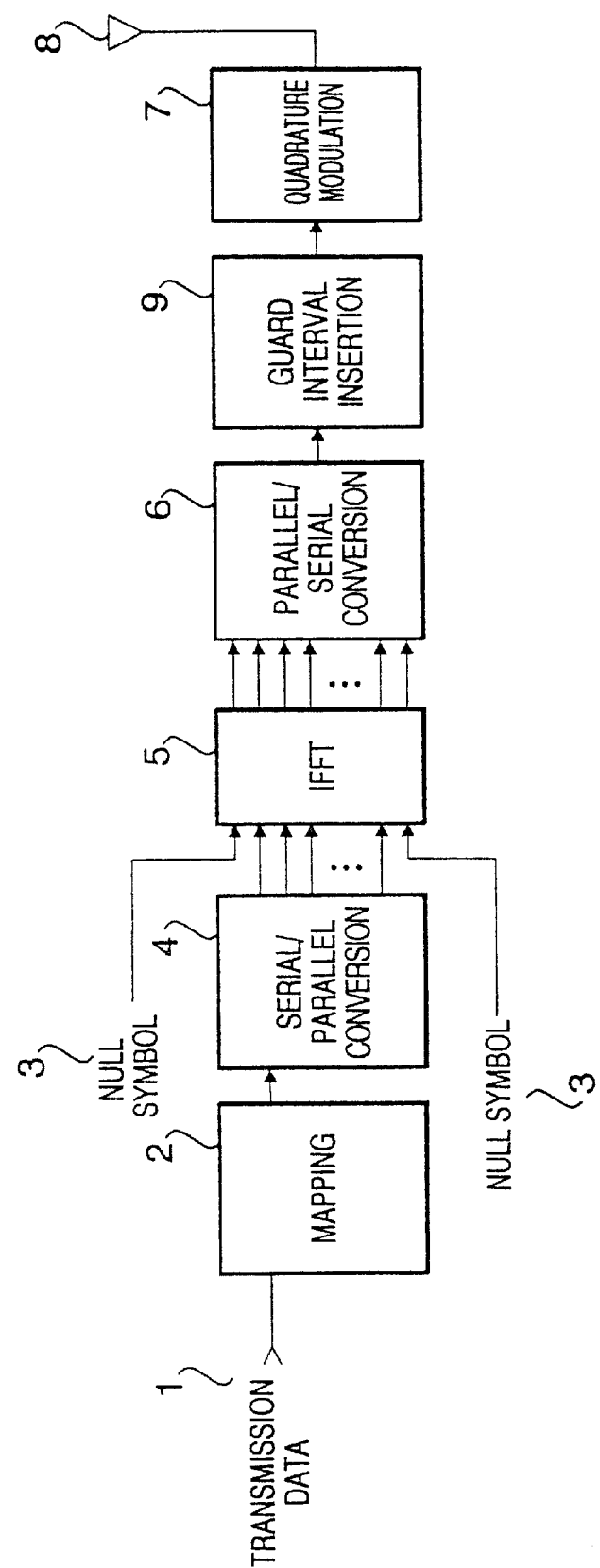
FIG. 4 is a functional block diagram of a conventional data transmission apparatus that inserts guard intervals.
Figure 5:
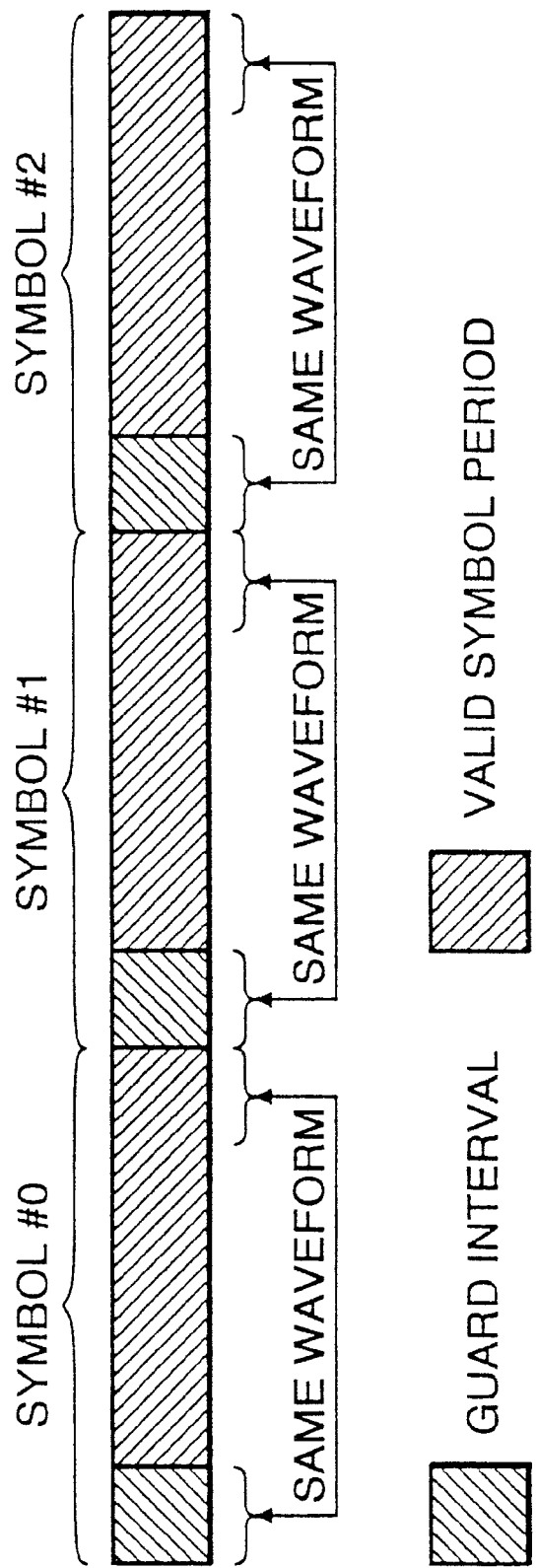
FIG. 5 is a conceptual drawing showing how to insert guard intervals.
Figure 6:
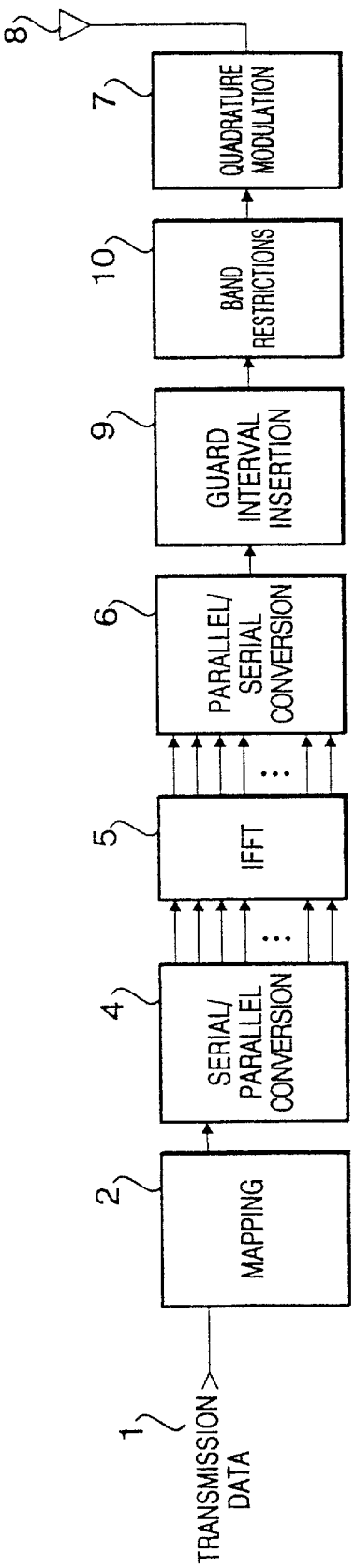
FIG. 6 is a functional block diagram of a conventional data transmission apparatus that applies band restrictions.
Figure 7:
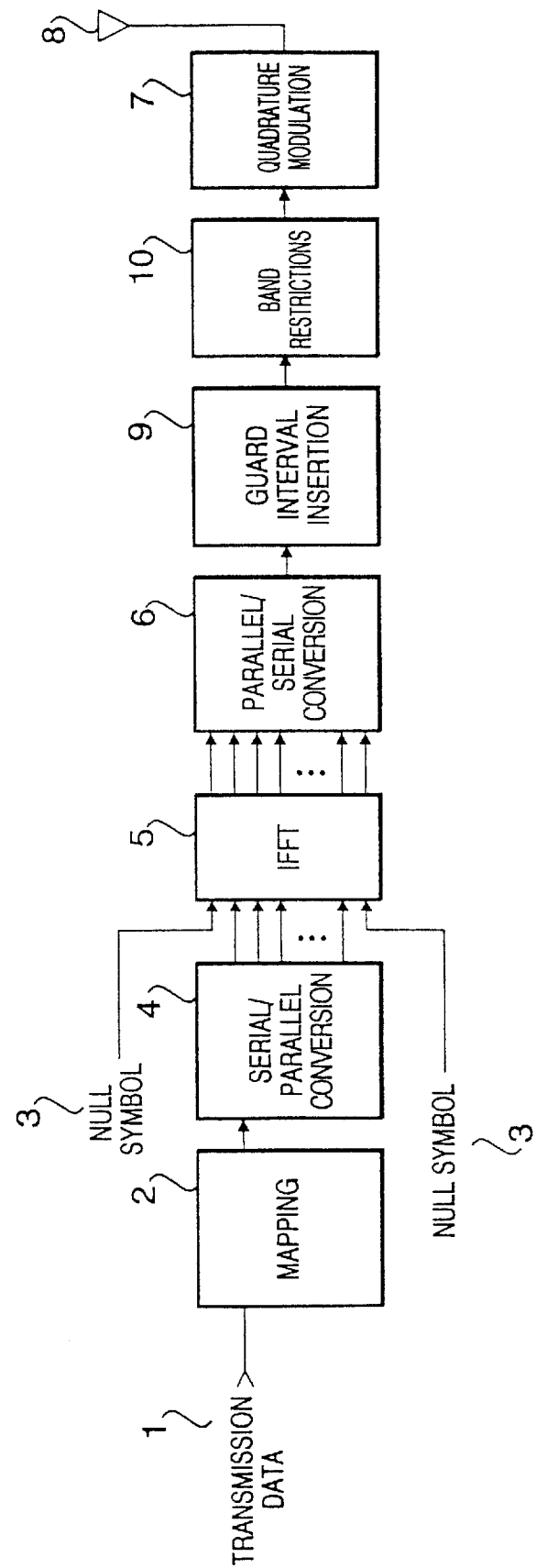
FIG. 7 is a functional block diagram of a conventional data transmission apparatus that disperses load between a guard frequency and guard interval.

A first embodiment of the present invention is a multi-carrier transmission method that sets the distance between sub-carriers so that they may be orthogonal to one another, assigns a plurality of sub-carriers to a specific band, and assigns low-speed variable signals to the guard frequency parts set at both ends of the specific band. This makes it possible to use bands that have not been available as guard frequencies.

In this method, it is desirable to convert a signal placed on the frequency axis of a specific band to a symbol time series and insert guard intervals between those symbols. This makes it possible to improve the resistance to multi-paths.

In this method, it is also desirable to have a continuous phase over a plurality of symbols for a low-speed variable signal which remains the same over a plurality of symbols according to the amount of phase change between guard intervals. In this way, even if guard intervals are inserted, the phase becomes continuous at a stage at which guard intervals are inserted.

In this method, it is desirable to apply band restrictions only to an area of unnecessary signals that can be eliminated through a filter with a short impulse response. This makes it possible to reduce leakage of signals to outside the band without extending guard intervals.

A second embodiment of the present invention is a multi-carrier transmission method using the OFDM system that places a low-speed variable signal instead of inserting null symbols at both ends of the band. This makes it possible to use bands which have not been available as guard frequencies.

A third embodiment of the present invention is a data transmission apparatus, comprising a plurality of mapping blocks that carry out mappings with different rates, a section that places signals subjected to low-speed mapping around a band to which a plurality of sub-carriers are assigned at an interval according to the symbol rate, and a section that converts a signal placed on the frequency axis of said band to a symbol time series. This configuration makes it possible to use bands which have not been available as guard frequencies, improving the frequency utilization efficiency and increasing the number of data that can be transmitted.

In this data transmission apparatus, it is desirable to provide a guard interval insertion block that inserts guard intervals between symbols and for the mapping block that carries out low-speed mapping to carry out mapping so that the phase of a low-speed signal may be continuous over a plurality of symbols according to the amount of phase change between guard intervals. This configuration makes the phase continuous at a stage at which guard intervals are inserted even if the signal remains the same over a plurality of symbols, making it also applicable when guard intervals are used.

Furthermore, in this data transmission apparatus, it is desirable to provide a band restriction block to apply band restrictions only to an area of unnecessary signals which can be eliminated through a filter with a short impulse response. This configuration can achieve a reduction of load on the filter and secure the frequency utilization efficiency as well as time utilization efficiency simultaneously.

The multi-carrier transmission and data transmission apparatuses in the present invention are applicable to mobile station and base station apparatuses in a radio communication system. This allows the frequency utilization efficiency in the radio communication system to be improved.

With reference now to the attached drawings, the embodiments of the present invention are explained in detail.

(Embodiment 1)

Figure 8:
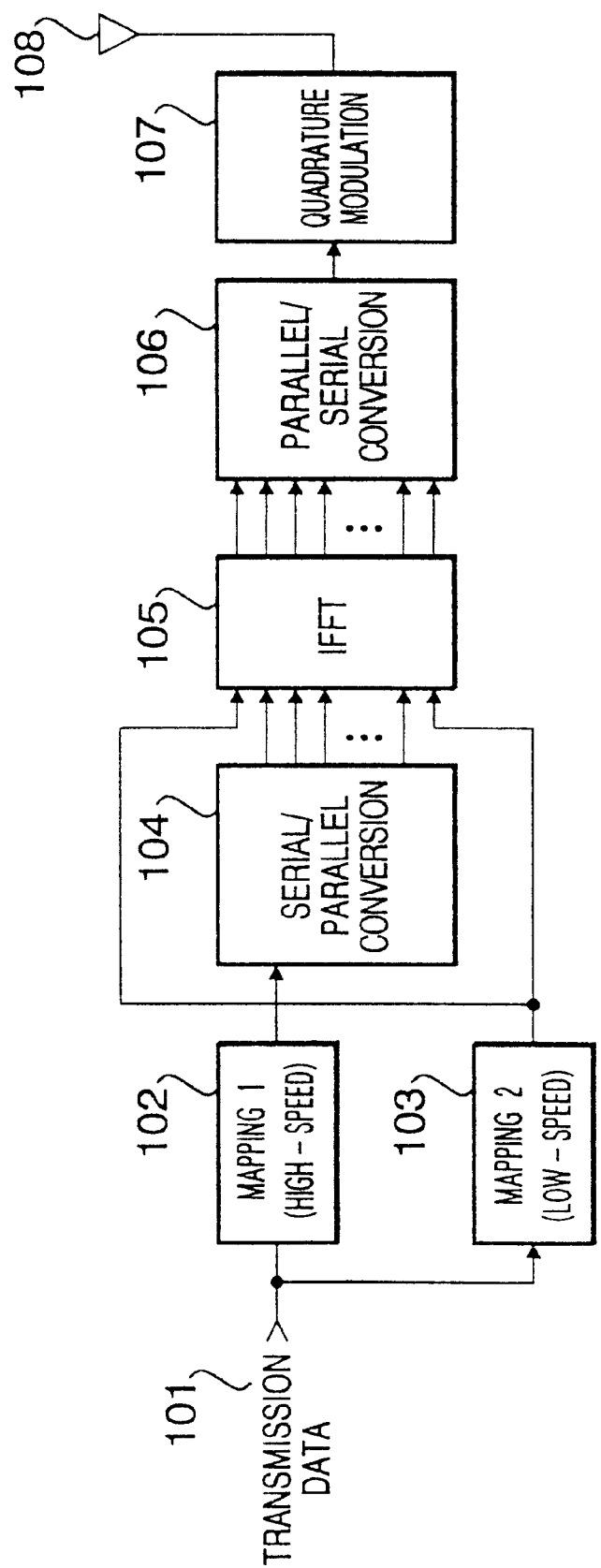
FIG. 8 is a functional block diagram of the conventional data transmission apparatus that relates to Embodiment 1 of the present invention.

FIG. 8 is a functional block diagram showing the configuration of the data transmission apparatus in Embodiment 1 of the present invention. In Embodiment 1, the data transmission apparatus using the OFDM system, one of the multi-carrier transmission systems, is explained. That is, the distance between sub-carriers is set to a fraction of the symbol rate so that the sub-carriers may be orthogonal to one another, a number of sub-carriers are assigned to a narrow band and guard frequencies are set by the spread portion of the spectrum of sub-carriers at both ends of the spectrum.

The data transmission apparatus in Embodiment 1 comprises high-speed mapping block 102 that maps transmission data 101 as high-speed symbol rate data by high-speed mapping 1, low-speed mapping block 103 that maps transmission data 101 as low-speed symbol rate data by low-speed mapping 2. Only the data mapped by high-speed mapping block 102 are serial/parallel-converted in serial/parallel conversion block 104. The serial/parallel-converted data are input to inverse Fourier transformation block 105 and the data mapped in low-speed mapping block 103 are input to inverse Fourier transformation block 105 instead of null symbols. Inverse Fourier transformation block 105 subjects the serial/parallel-converted signal and low-speed mapped signal to inverse Fourier transformation into a time-series signal. This time-series signal is quadrature-modulated in quadrature modulation block 107 to a radio frequency signal and transmitted from transmission antenna 108.

The operation of the data transmission apparatus configured as shown above is explained. Transmission data 101 is divided into a plurality of portions by rate and mapped at different speeds. In FIG. 8, there is a division into mappings with 2 types of speed, however it may be divided into any number of types. The signal sent to high-speed mapping block 102 is mapped as high-speed symbol rate data by high-speed mapping 1. On the other hand, the signal sent to low-speed mapping block 103 is mapped as low-speed symbol rate data by low-speed mapping 2. For example, the low-speed rate is assumed to be ½ of the high-speed rate.

Figure 9:
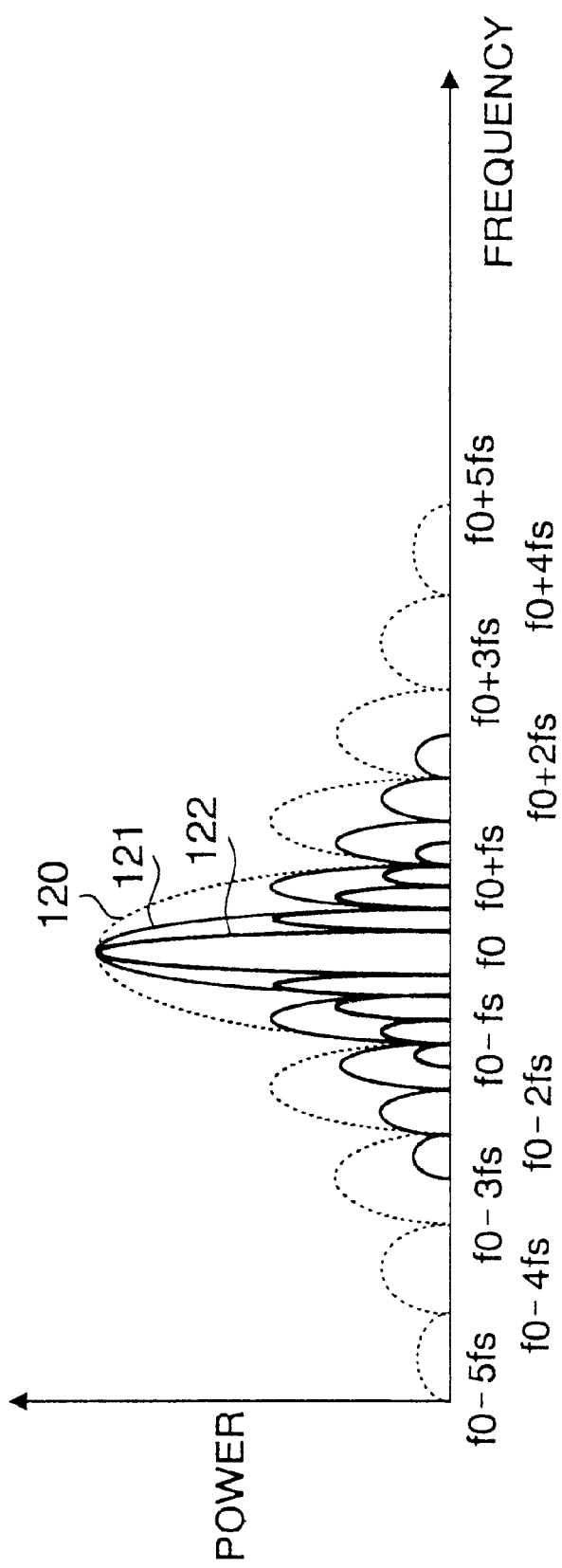
FIG. 9 is a spectral map of a single carrier.

FIG. 9 is drawing showing the spectrum of a single sub-carrier of signals with different rates. In said figure, broken line 120 represents the spectrum of a signal subjected to high-speed mapping, fine solid line 121 represents the spectrum of a signal with a rate ½ of the rate of signal 120 and bold solid line 122 represents the spectrum of a signal with a rate ¼ of the rate of signal 120.

Figure 10:
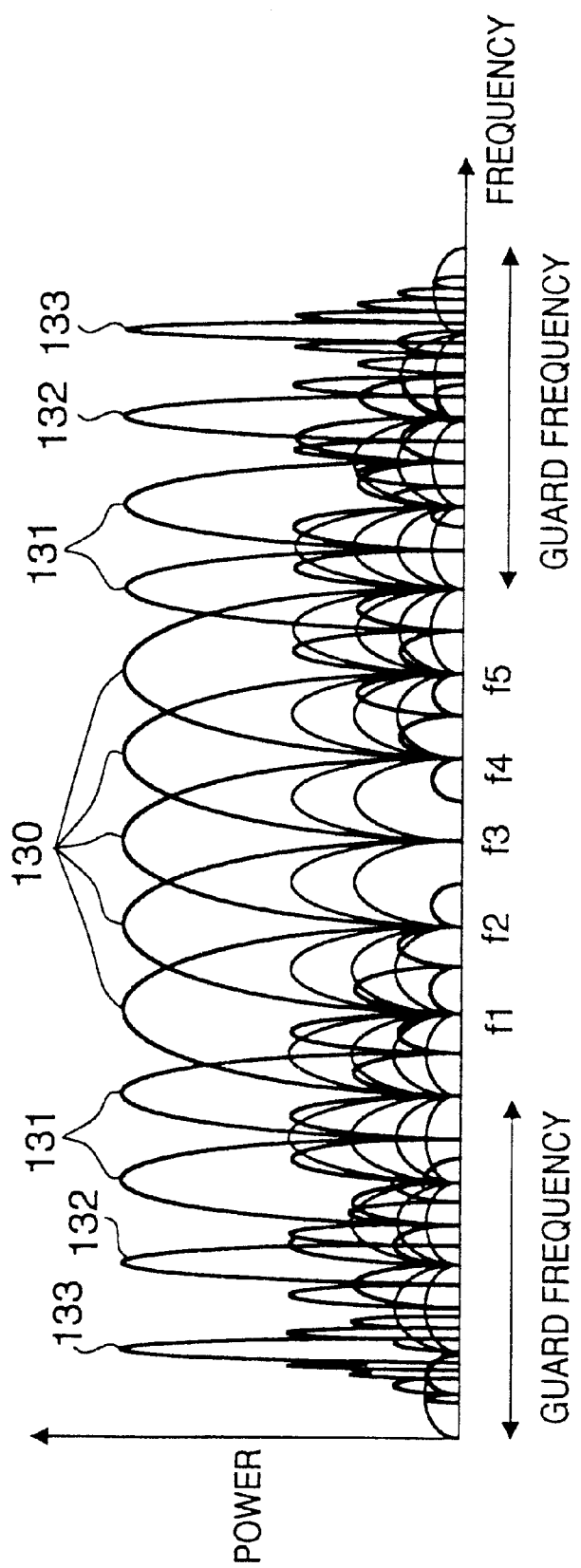
FIG. 10 is a spectral map showing the signal layout of the data transmission apparatus in Embodiment 1.

In the present embodiment, if the sub-carriers of signals with different rates as shown in FIG. 9 are lined up on the frequency axis, low-speed signals are placed at both ends of a high-speed rate signal as shown in FIG. 10. In FIG. 10, fine solid line 130 represents a signal subjected to high-speed mapping, solid line 131 represents the spectrum of a signal with a rate ½ of the rate of signal 130, solid line 132 represents the spectrum of a signal with a rate ¼ of the rate of signal 130, and solid line 133 represents the spectrum of a signal with a rate ⅛ of the rate of signal 130.

The spectrum of highest-speed rate signal 120 becomes 0 at a frequency obtained by multiplying the inverse number (FS) of the symbol rate by an integer multiple. As seen from FIG. 9, if their mutual rates have a relationship of a power of 2, the spectra of other signals 121 and 122 also become 0 on the frequency. That is, the signals having a mutual relationship of a power of 2 are all orthogonal to the signal with the highest rate. Using this fact, placing signals with a low-speed rate at both ends of a signal with a high-speed rate allows signals to be transmitted effectively while maintaining their orthogonal relationship.

Then as described above, signal 131 with a rate ½ of that of the high-speed rate signal is placed at the position of two carrier frequencies next to high-speed rate signal 130, signal 132 with a rate ¼ of that of the high-speed rate signal is placed next to signal 131, and signal 133 with a rate ⅛ of that of the high-speed rate signal is placed next to signal 132. Thus, at the position of the spectral peak of each transmission rate is the null point of another spectrum. Therefore, placing signals as shown above does not affect transmission. As a result, it is possible to transmit extra information corresponding to 2.75 sub-carriers of the high-speed rate signal.

Furthermore, since a low-rate signal has a time diversity effect and high quality, an effect corresponding to 2.75 or more sub-carriers can be expected by assigning a signal with-high quality requirements among information to be transmitted such as the most significant bit of a voice signal and control signal to the position of the low-rate signal.

(Embodiment 2)

The data transmission apparatus according to Embodiment 2 of the present invention carries out the processing in Embodiment 1 above, and furthermore processing of inserting guard intervals.

Figure 11:
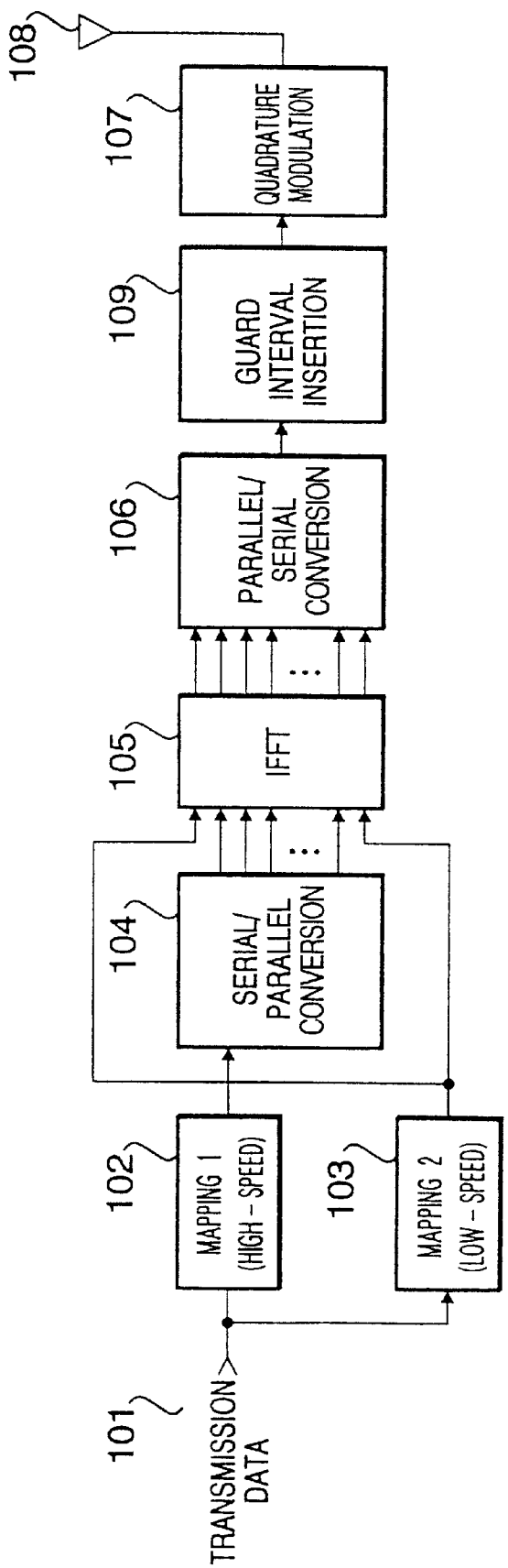
FIG. 11 is a functional block diagram of the data transmission apparatus that relates to Embodiment 2 of the present invention.

FIG. 11 is a functional block diagram showing the configuration of the data transmission apparatus according to Embodiment 2 of the present invention. The data transmission apparatus in present Embodiment 2 comprises high-speed mapping block 102 that maps part of transmission data 101 by means of high-speed mapping 1, low-speed mapping block 103 that maps the rest of transmission data 101 by means of low-speed mapping 2, serial/parallel conversion block 104 that serial/parallel-converts the transmission data mapped by high-speed mapping 1, inverse Fourier transformation block 105, and parallel/serial conversion block 106. Furthermore, the data transmission apparatus also comprises guard interval insertion block 109 that inserts guard intervals into a parallel/serial-converted time-series signal. It further comprises quadrature modulation block 107 and transmission antenna 108. In FIG. 11 there is a division into mappings with 2 kinds of speed, however it may be divided into any number of types.

The operation of the data transmission apparatus configured as shown above is explained. Transmission data 101 is divided into a plurality of portions by rate and mapped at different rates. The signal sent to high-speed mapping block 102 is mapped as high-speed symbol rate data by means of high-speed mapping 1. On the other hand, the signal sent to low-speed mapping block 103 is mapped as low-speed symbol rate data by low-speed mapping 2. For example, the low-speed symbol rate is set to ½ of the high-speed rate. The signal subjected to high-speed mapping is serial/parallel-converted by serial/parallel conversion block 104, subjected to inverse Fourier transformation (IFFT) in inverse Fourier transformation block 105 together with the low-speed mapped signal, parallel/serial-converted by parallel/serial conversion block 106 to a time-series signal. This time-series signal, with guard intervals inserted by guard interval insertion block 109, is quadrature-modulated by quadrature modulation block 107 to a radio frequency and transmitted from transmission antenna 108.

As described above, when carrying out multi-carrier transmission of symbols with different rates, a low-speed rate signal with a rate ½ of the high-speed rate, for example, remains the same over 2 symbols, but it may lose the phase continuity at a stage at which guard intervals are inserted. Thus, guard interval insertion block 109 needs to adjust the phase so that it may be continuous at the stage of insertion of guard intervals in guard interval insertion block 109.

In Embodiment 2, the phase that changes at guard intervals is calculated based on the relationship between the length of the guard interval and sub-carrier frequency beforehand, and low-speed mapping block 103 carries out mapping by taking account of the calculated phase change portion. This allows the spread of the spectrum to be suppressed despite the presence of guard intervals.

Furthermore, Embodiment 2 is intended to improve the frequency utilization efficiency by assigning a low--rate signal to the guard frequency parts set at both ends of the band to which a plurality of sub-carriers were assigned.

Figure 12:
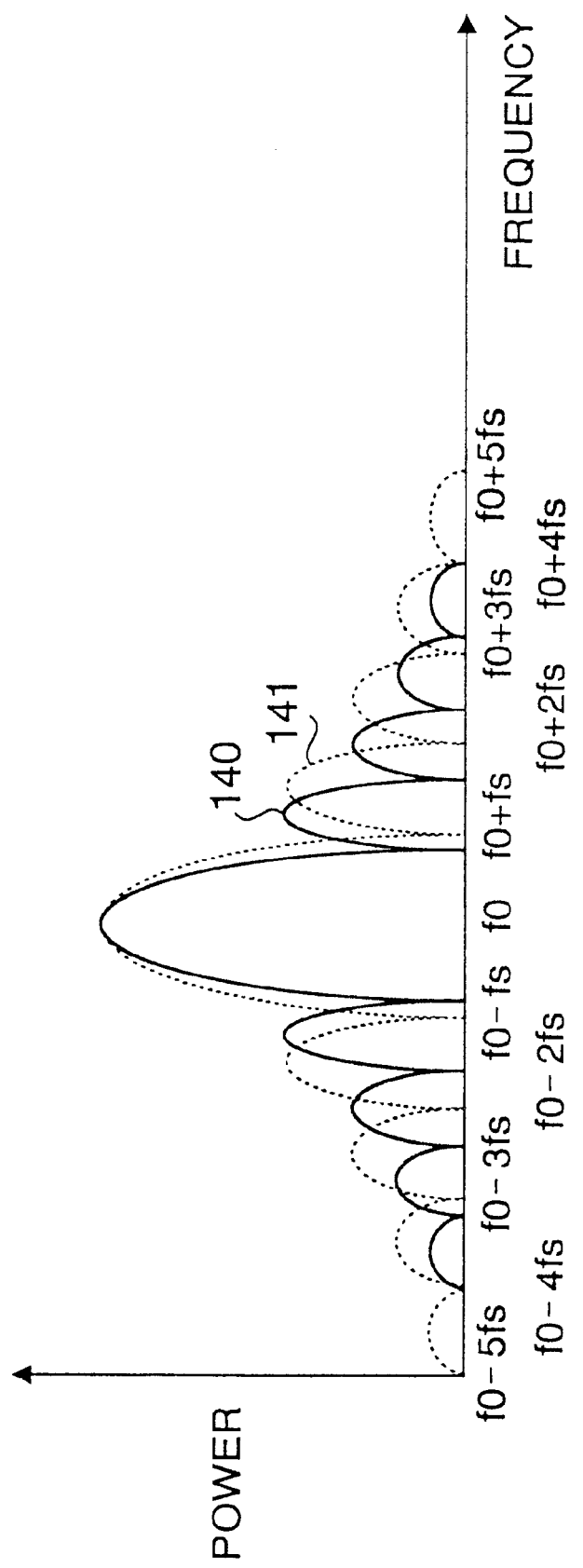
FIG. 12 is a spectral map of a single carrier when guard intervals are inserted.

FIG. 12 is the spectrum of a single carrier. The result of inserting guard intervals is as shown with solid line 140, which is narrower than original spectrum 141.

Figure 13:
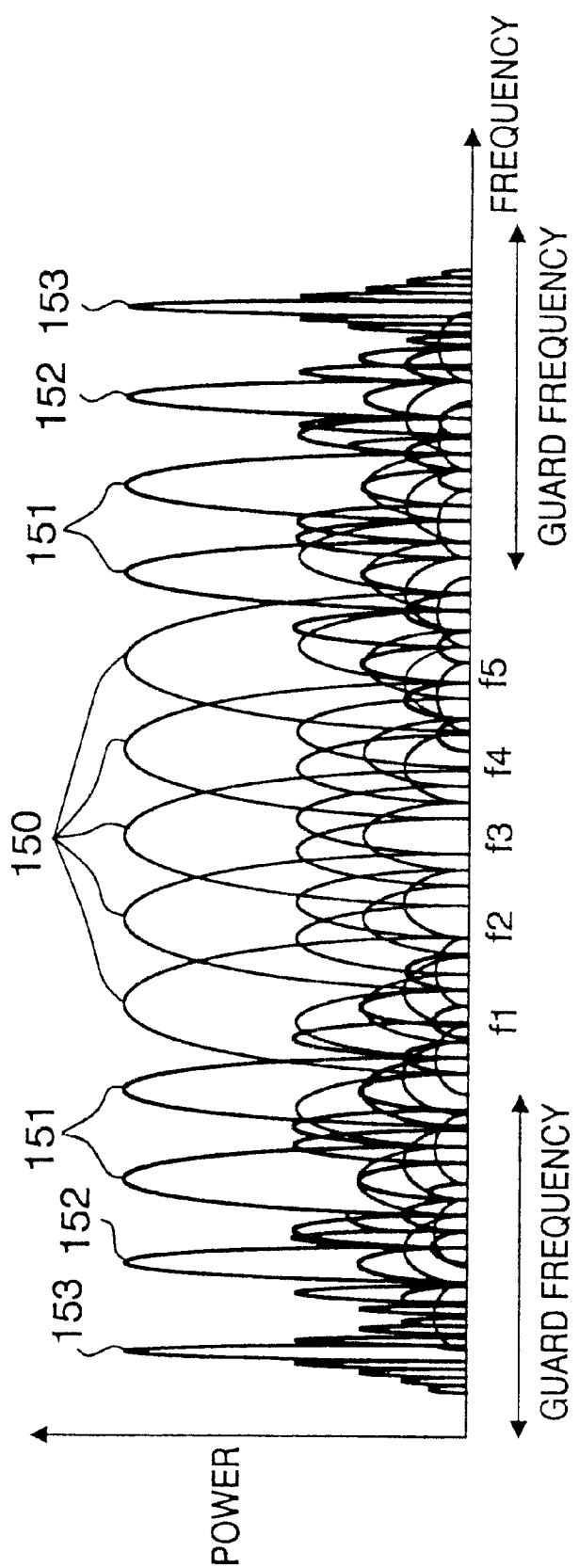
FIG. 13 is a spectral map showing the signal layout in the data transmission apparatus in Embodiment 2.

As with Embodiment 1, placing low-speed signals at both ends of a high-speed rate signal makes it possible to transmit signals effectively while maintaining an orthogonal relationship. In FIG. 13, placing signal 151 with a rate ½ of the high-speed rate at the positions of 2 carriers next to signal 150, placing signal 152 with a rate ¼ of the high-speed rate next to signal 151, and placing signal 153 with a rate ⅛ of the high-speed rate next to signal 152 will make it possible to effectively utilize the areas that have not been available so far. This allows extra information corresponding to 2.75 sub-carriers of a high-speed rate signal to be transmitted.

Furthermore, since a low-rate signal has a time diversity effect and high quality, an effect corresponding to 2.75 or more sub-carriers can be expected by assigning a signal with high quality requirements among information to be transmitted such as the most significant bit of a voice signal and control signal to the position of a low-rate signal.

In FIG. 13, sub-carriers do not seem to be orthogonal to one another, but they become orthogonal to one another if the guard intervals are removed, and thus they can be separated completely at the time of demodulation.

As described above, the present embodiment can introduce guard intervals and thus it can improve the frequency utilization efficiency and realize transmission resistant to multi-paths as well.

(Embodiment 3)

The data transmission apparatus in Embodiment 3 of the present invention carries out processing of Embodiment 2 above and further carries out processing of band restrictions.

Figure 14:
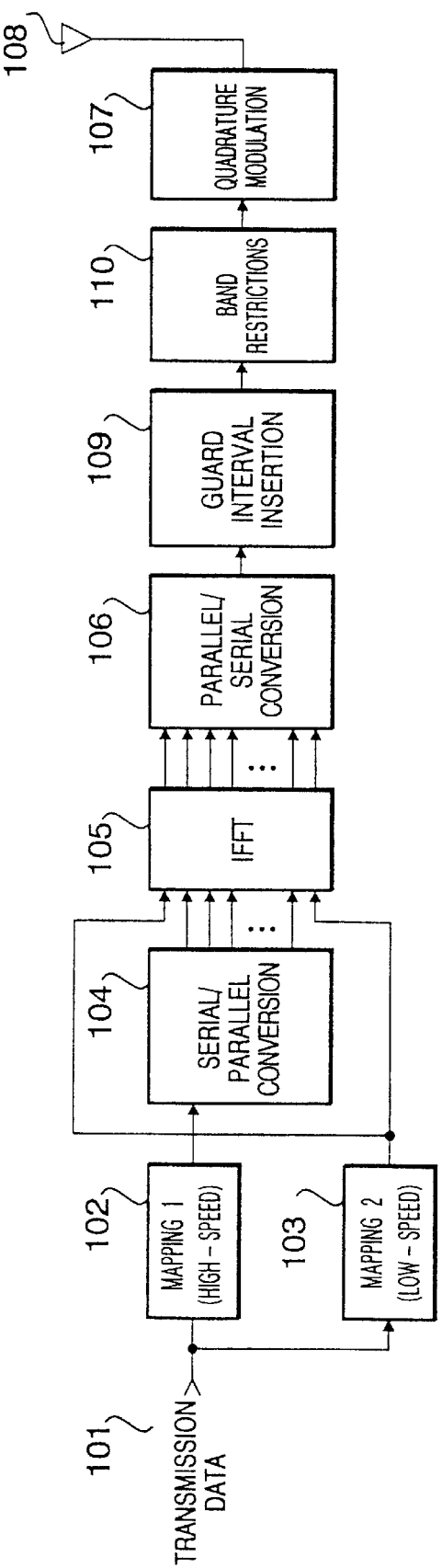
FIG. 14 is a functional block diagram of the data transmission apparatus that relates to Embodiment 3 of the present invention.

FIG. 14 is a functional block diagram showing the configuration of the data transmission apparatus according to Embodiment 3 of the present invention. The data transmission apparatus in Embodiment 3 comprises high-speed mapping block 102 that maps part of transmission data 101 by means of high-speed mapping 1, low-speed mapping block 103 that maps the rest of transmission data 101 by means of low-speed mapping 2, serial/parallel conversion block 104 that serial/parallel-converts the transmission data mapped by means of high-speed mapping 1, inverse Fourier transformation block 105, parallel/serial conversion block 106 and guard interval insertion block 109. Furthermore, the data transmission apparatus also comprises band restriction block 110 that carries out band restrictions after inserting guard intervals. It further comprises quadrature modulation block 107 and transmission antenna 108. In FIG. 14 there is a division into mappings with 2 types of speed, however it may be divided into any number of types.

The operation of the data transmission apparatus configured as shown above is explained. A part of transmission data 101 is input to high-speed mapping block 102 and another part is sent to low-speed mapping block 103. The signal sent to high-speed mapping block 102 is mapped as high-speed symbol rate data by means of high-speed mapping 1. On the other hand, the signal sent to low-speed mapping block 103 is mapped as low-speed symbol rate data by means of low-speed mapping 2. For example, the low-speed rate is set to ½ of the high-speed rate. The signal subjected to high-speed mapping is serial/parallel-converted by serial/parallel conversion block 104, subjected to inverse Fourier transformation in inverse Fourier transformation block 105 together with the low-speed mapped signal. These signals are parallel/serial-converted by parallel/serial conversion block 106 to a time-series signal, and guard intervals are inserted into it by guard interval insertion block 109. This time-series signal is subjected to band restrictions in band restriction block 110 and quadrature-modulated by quadrature modulation block 107 to a radio frequency and transmitted from transmission antenna 108.

At this time, a signal with a rate ½ of the high-speed rate for example, remains the same over 2 symbols. Thus, in low-speed mapping block 103, the phase that changes at guard intervals is calculated beforehand based on the relationship between the length of the guard interval and sub-carrier frequency and mapping is carried out by taking account of the changing phase. Mapping is carried out in this way so that the phase may be continuous at a stage at which guard interval insertion block 109 has inserted guard intervals. This makes it possible to suppress the spread of the spectrum even with the presence of guard intervals.

Furthermore, by applying band restrictions through band restriction block 110 unnecessary low-level signals that can be removed easily through a simple filter and a filter with a short impulse response are removed through filters. At this time, a low-speed rate signal is placed in an area where there are signals which are difficult to be removed. This can reduce load on the filter, secures the frequency utilization efficiency and time utilization efficiency simultaneously.

The data transmission apparatus in the embodiment above is used in a mobile radio communication system. For example, suppose the above data transmission apparatuses are incorporated in a mobile station and base station and data transmission is carried out between the mobile station and base station according to the OFDM system explained in the above embodiment. Especially, it is effective when using a band by dividing it for each user on the uplink.

As described in detail above, the present invention can improve the frequency utilization efficiency at both ends of the OFDM band. Furthermore, since guard intervals can also be introduced, it also becomes resistant to multi-paths. In addition, it can secure the frequency utilization efficiency and time utilization efficiency simultaneously by introducing band restrictions.

Industrial Applicability

The multi-carrier transmission method and the data transmission apparatus that implements the method are useful in a radio communication system.

What is claimed is:

1. A multi-carrier transmission method, comprising:
   assigning high-rate data to a plurality of first sub-carriers, orthogonal to one another, set on a specific frequency band;
   assigning low-rate data to second sub-carriers, orthogonal to the first sub-carriers, set on guard frequency bands on both sides of the specific frequency band; and concurrently transmitting the high-rate data and the low-rate data.

2. The multi-carrier transmission method according to claim 1, wherein a transmission rate of the low-rate data is $\frac{1}{2}^n$ a transmission rate of the high-rate data.

3. The multi-carrier transmission method according to claim 1, wherein data requiring high quality among transmission data is assigned to the second sub-carriers as the low-rate data.

4. The multi-carrier transmission method according to claim 1, wherein the low-rate data is subjected to mapping in association with a phase variation at a guard interval, so that a phase of multi-carrier signal is continuous at the guard interval.

5. A data transmitting apparatus comprising:
   a mapping system that carries out high-rate mapping and low-rate mapping with different rates;
   an assignor that assigns first data subjected to the high-rate mapping to a plurality of first sub-carriers, orthogonal to one another, set on a specific frequency band, and further assigns second data subjected to the low-rate mapping to second sub-carriers, the second sub-carriers being orthogonal to the first sub-carriers and set on guard frequency bands on both sides of the specific frequency band; and
   a transmitter that transmits the multi-carrier signal including the first data and the second data assigned by the assignor.

6. A mobile station apparatus comprising the data transmitting apparatus according to claim 5.

7. A base station apparatus comprising the data transmitting apparatus according to claim 5.

8. An OFDM transmitting apparatus comprising:
   a mapping system that performs mapping on transmission data;
   an IFFT system that performs inverse Fast Fourier transform on the transmission data input in parallel from the mapping system; and
   a transmitter that transmits an OFDM signal output from the IFFT system,
      wherein the mapping system carries out high-rate mapping and low-rate mapping with different rates,
      the IFFT system assigns first data subjected to the high-rate mapping to a plurality of first sub-carriers, orthogonal to one another, set on a specific frequency band, while assigning second data subjected to the low-rate mapping to second sub-carriers, the second subcarriers being orthogonal to the first sub-carriers and set on guard frequency bands on both sides of the specific frequency band, to perform inverse Fast Fourier transform, and
      the transmitter transmits the OFDM signal including the first data and the second data.

9. A mobile station apparatus comprising the OFDM transmitting apparatus according to claim 8.

10. A base station apparatus comprising the OFDM transmitting apparatus according to claim 8.

* * * * *

UNITED STATES PATENT AND TRADEMARK OFFICE
CERTIFICATE OF CORRECTION

PATENT NO.    : 6,510,133 B1
DATED         : January 21, 2003
INVENTOR(S)   : M. Uesugi It is certified that error appears in the above-identified patent and that said Letters Patent is hereby corrected as shown below:

<u>Title page,</u>
Item [87], PCT Pub. Date, "March 12, 1998" should be -- December 3, 1998 --.

Signed and Sealed this

Seventeenth Day of June, 2003

JAMES E. ROGAN
*Director of the United States Patent and Trademark Office*